No. 776,913.

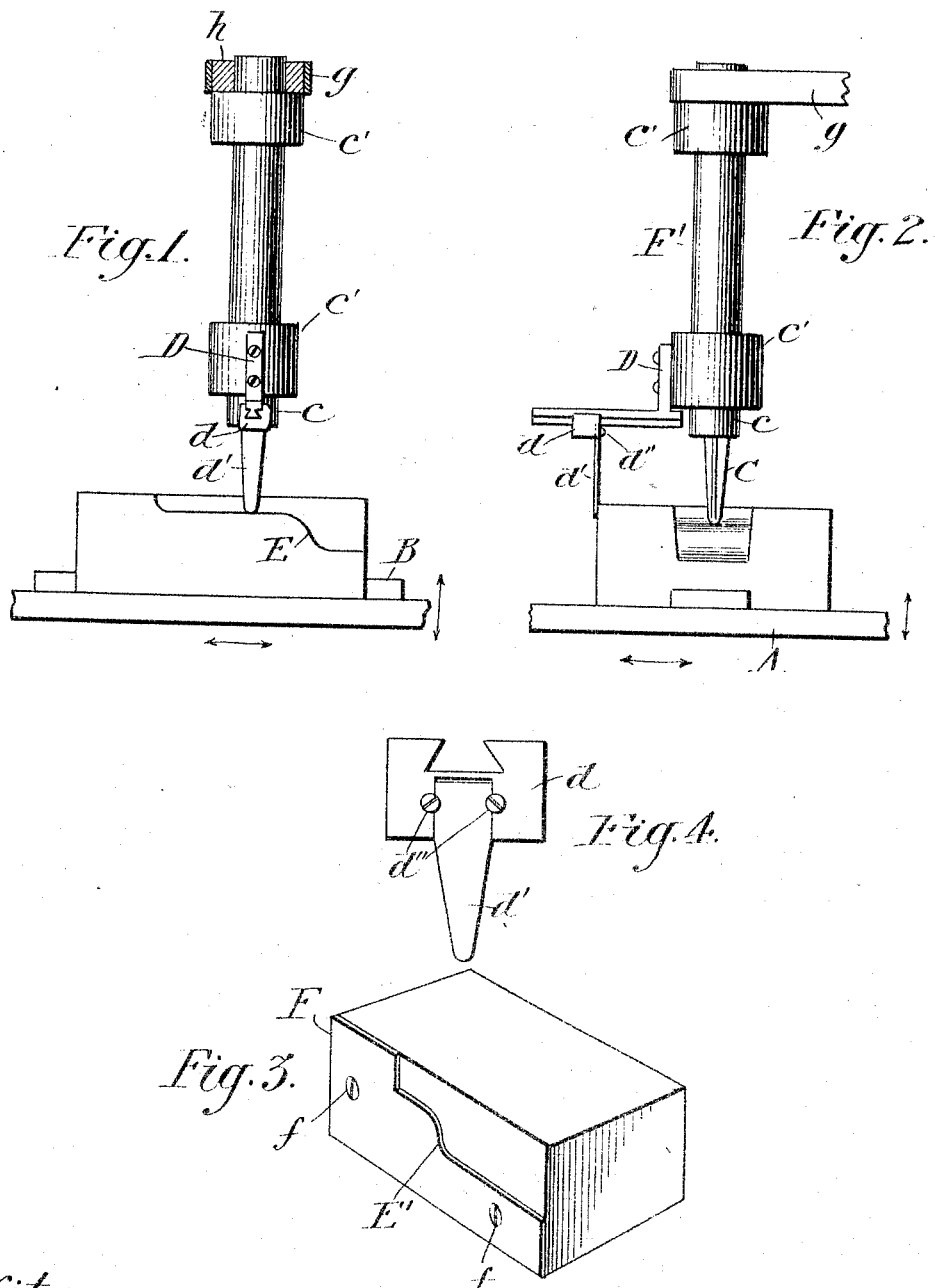

Patented December 6, 1904.

UNITED STATES PATENT OFFICE.

WILLIAM HUNZIKER, OF RICHMOND, VIRGINIA.

DIE-SINKING MACHINE.

SPECIFICATION forming part of Letters Patent No. 776,913, dated December 6, 1904.

Application filed July 26, 1904. Serial No. 218,262. (No model.)

*To all whom it may concern:*

Be it known that I, WILLIAM HUNZIKER, a citizen of the United States, and a resident of Richmond, county of Henrico, State of Virginia, have invented certain new and useful Improvements in Die-Sinking Machines, of which the following is a specification.

My invention relates to die-sinking machines, and more particularly to an indicating attachment for such machines, whereby an accurate guide for the operator is provided in order that he may accurately control the contour of the slot or cut which is sunk in the die-block by the operation of the die cutting or milling tool.

Prior to my invention it has been the common practice—and, so far as I am aware, the universal practice—to rely solely upon the skill of the machinist in judging when the proper contour is being outlined by the cutting or milling tool, such contour being determined solely by the controlling of the different feeds, according to the character of milling-machine used, with the result that such contours of the slots or cuts made in the die-block depend upon guesswork rather than upon any accurate and definite guide to insure the desired shape or contour. As a consequence of such guesswork it is practically the invariable custom of the machinist to so control his feed-motions as to leave excess of metal at various parts, which afterward are removed by hand cutting-tools.

My object is to provide an indicator or guide whereby the operator may readily and accurately control the cutting operation of the cutting or milling tool to produce the desired contour in sinking the die, and in accomplishing this object by my invention I insure in the simplest manner accurate following of the desired contour by the cutting-tool, thus obviating any subsequent hand-cutting or other operation to finish the work, thereby materially saving time, as well as insuring accuracy of the work.

With this essential object in view my invention consists in the novel attachment for a die-sinking machine and in the details thereof, as hereinafter described, with reference to the accompanying drawings, and more particularly pointed out in the claims.

In the drawings, Figure 1 represents in front view a sufficient portion of a die-sinking machine, partly in section, showing my invention applied thereto. Fig. 2 is a side view of the same. Fig. 3 is a modified form of my invention, and Fig. 4 is a detail hereinafter referred to.

Referring now to the drawings, wherein the same or similar reference characters relate to the same or corresponding parts in all the views, the letter A designates a part of a work-table, having the usual clamping devices for holding the work, as the die-block B, such table being capable of lateral and vertical motions through the medium of the usual feeding devices under the control of the operator, such devices not being shown, as they are of common form and constitute no part of my invention. The cutting or milling tool C is carried by a chuck $c$ on a spindle F', rotatably mounted in suitable bearings $c'$ above the table, motion being imparted to said spindle by a belt $g$, driven from a suitable shaft, (not shown,) and having a pulley $h$ on said spindle, all said parts being common and well-known elements in a milling-machine.

To the lower bearing $c'$ I attach a bracket D, provided with a slideway $d$, on which is slidably mounted an indicator arm or guide $d'$, so shaped and held as to conform in outline and position to a central longitudinal section of the cutting or milling tool C, such arm being free to slide laterally with respect to the work. With the arm so arranged the lower end thereof will at all times, it is obvious, maintain a fixed relation to the lower end of the tool C, and in order to insure the lower end of the same being in the same plane normal to the axis of the tool I provide for a limited adjustment of the arm $d'$, as by screws $d''$, the heads of which overlap the sides of the arm, so that by releasing the screws the arm can be moved up or down to adjust the lower end thereof in the manner and to the position defined.

As the end of the arm $d'$ occupies the fixed relation to the lower end of the tool C above defined, it is evident that its distance below the top of the die-block, as seen from the outside thereof, will be the same as the distance of the lower end of the tool within and below the upper face of said die-block, and hence if a contour line or mark conforming to the contour of the desired cut in the block be provided in close proximity to the said arm the operator can readily observe the different positions which the end of the arm $d'$ must occupy along said contour line or mark in order that the tool may be caused to follow the corresponding contour in its cutting operation. As a convenient and simple means of furnishing this guide for the operator I scribe or mark on the side of the block B a contour-line E or contour-lines, as the case may be, corresponding to the desired contour of the die, and slide the arm $d'$ into contact with the side of the block and adjust the machine with the lower end of the arm or indicator in contact with said contour-line, and as the machine is operated the operator can readily govern the feed, so as to cause the indicator to follow the contour-line, thus insuring accurate cutting of the corresponding contour in the die-block. This visual indicator or guide, it will be observed, obviates the objections hereinbefore pointed out as existing in the prior practice, and its simplicity and efficiency contribute to the advantages derived from its use.

Instead of making or scribing a line or mark as the contour-guide on the side of the block I may attach to the side of said block a templet F, the pattern $E'$ of which constitutes the guide and corresponds to the desired contour and causes the lower end of the indicator to slide along the said pattern with the same result as before.

I claim as my invention—

1. The combination with a die-sinking machine having a cutting-tool, and means for operating the same, of an indicating-arm laterally slidable with reference to the work, and having its lower end in the same plane with the lower end of the cutting-tool, and a guide on the work conforming to the contour of the desired cut in the work, substantially as described.

2. The combination with a die-sinking machine having a cutting-tool and a work-holder movable relatively toward and from the other, and means for operating the same, of an indicating-arm having its lower end in the same plane with the lower end of the cutting-tool, and a guide on the outside of the work conforming to the contour of the desired cut of the work and along which guide the indicator-arm is caused to follow and there indicate the contour of the cut that is being made by the tool in the work, substantially as described.

3. The combination with a die-sinking machine having a cutting-tool and means for operating the same, of an indicator-arm laterally movable with reference to the tool and having its lower end in the same plane with the lower end of the cutting-tool, and a templet attached to the work and having a pattern corresponding to the contour of the desired cut in the work, along which pattern the lower end of the indicator-arm may be caused to follow and there indicate the contour of the cut that is being made in the work, substantially as described.

In testimony whereof I have signed my name to this specification in the presence of two subscribing witnesses.

WILLIAM HUNZIKER.

Witnesses:
R. T. FRAZIER,
PHILIP F. LARNER.